US012572972B2

(12) United States Patent
Nambu et al.

(10) Patent No.: US 12,572,972 B2
(45) Date of Patent: Mar. 10, 2026

(54) STORE SYSTEM APPARATUS

(71) Applicant: Toshiba Tec Kabushiki Kaisha, Tokyo (JP)

(72) Inventors: Kazuya Nambu, Nakano Tokyo (JP); Yuna Otani, Ota Tokyo (JP); Maki Sato, Yokohama Kanagawa (JP); Kuniyoshi Yamada, Adachi Tokyo (JP); Mayuko Tsunoda, Yokohama Kanagawa (JP); Souichi Yamamoto, Yokohama Kanagawa (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 79 days.

(21) Appl. No.: 18/422,886

(22) Filed: Jan. 25, 2024

(65) Prior Publication Data

US 2024/0273602 A1     Aug. 15, 2024

(30) Foreign Application Priority Data

Feb. 13, 2023     (JP) ................................. 2023-020172

(51) Int. Cl.
*G06Q 30/00* (2023.01)
*G06Q 30/0601* (2023.01)
(52) U.S. Cl.
CPC ................................ *G06Q 30/0631* (2013.01)
(58) Field of Classification Search
CPC ............................................... G06Q 30/06–08
See application file for complete search history.

(56) References Cited

U.S. PATENT DOCUMENTS

| | | | | |
|---|---|---|---|---|
| 2017/0186068 A1* | 6/2017 | Dumouchel | ....... | G06Q 30/0643 |
| 2018/0040044 A1* | 2/2018 | Mattingly | .......... | G06Q 30/0617 |
| 2020/0090248 A1* | 3/2020 | Zeng | .................. | G06Q 30/0205 |
| 2021/0192596 A1* | 6/2021 | Archak | ............ | G06F 16/24578 |

FOREIGN PATENT DOCUMENTS

| | | |
|---|---|---|
| JP | 2019040242 A | 3/2019 |
| JP | 2021089572 A | 6/2021 |

OTHER PUBLICATIONS

Japanese Office Action dated Nov. 18, 2025, mailed in counterpart Japanese Application No. 2023-020172, 8 pages.

* cited by examiner

*Primary Examiner* — Ethan D Civan
(74) *Attorney, Agent, or Firm* — Kim & Stewart LLP

(57) ABSTRACT

According to one embodiment, a store system apparatus includes a communication interface connectable to a terminal of a customer of a store, a storage unit storing registration results of a plurality of customers, and a processor. The processor is configured to acquire position information of the terminal of the customer via the communication interface and output recommended commodity information via the communication interface to the terminal according to an area of the store corresponding to the acquired position information. The recommended commodity information indicates a recommended commodity that is in the area of the store. The processor also outputs registration summary information based on the stored registration results of the plurality of customers via the communication interface to the terminal.

20 Claims, 8 Drawing Sheets

FIG. 5

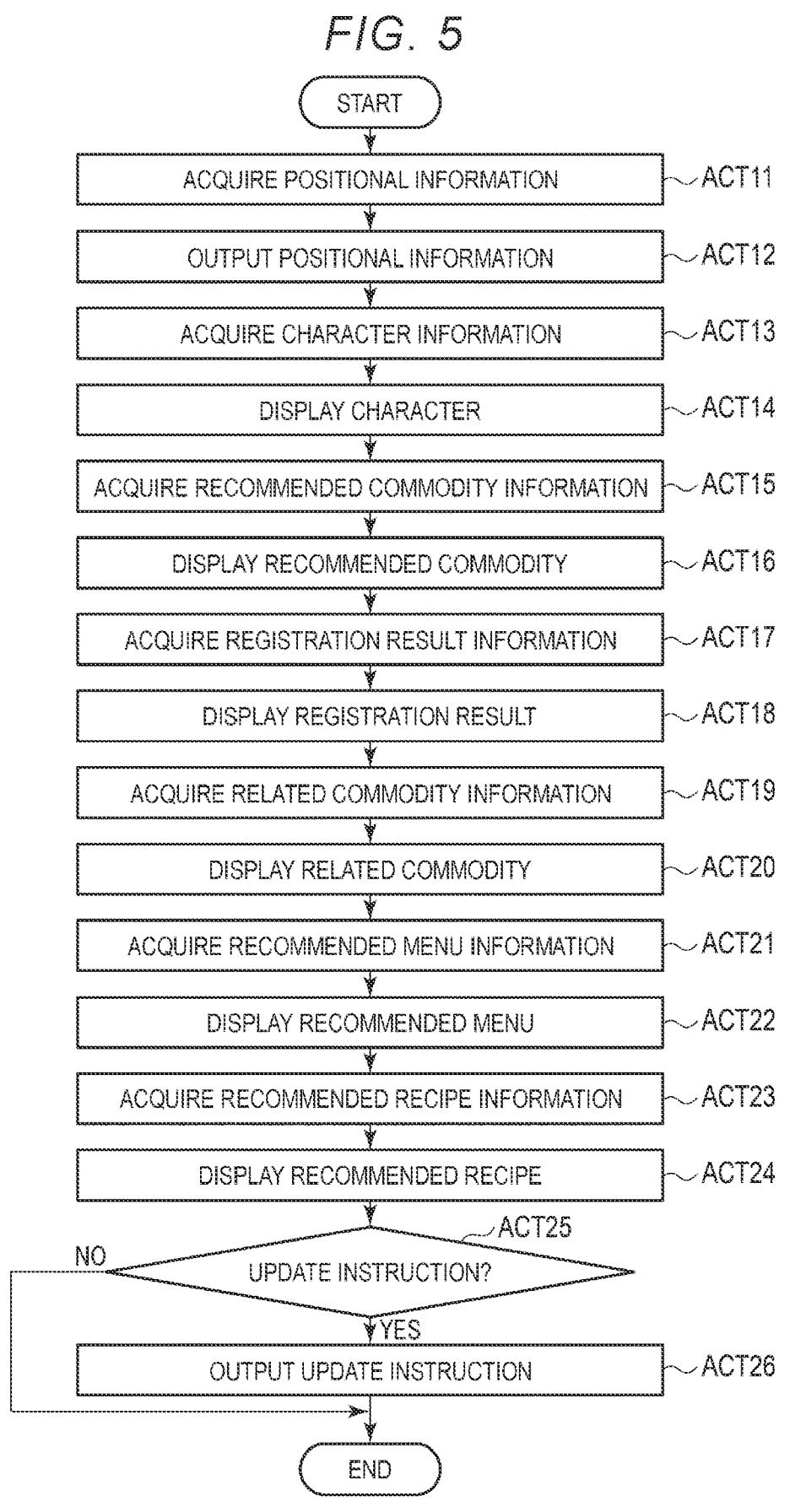

START

ACQUIRE POSITIONAL INFORMATION — ACT11

OUTPUT POSITIONAL INFORMATION — ACT12

ACQUIRE CHARACTER INFORMATION — ACT13

DISPLAY CHARACTER — ACT14

ACQUIRE RECOMMENDED COMMODITY INFORMATION — ACT15

DISPLAY RECOMMENDED COMMODITY — ACT16

ACQUIRE REGISTRATION RESULT INFORMATION — ACT17

DISPLAY REGISTRATION RESULT — ACT18

ACQUIRE RELATED COMMODITY INFORMATION — ACT19

DISPLAY RELATED COMMODITY — ACT20

ACQUIRE RECOMMENDED MENU INFORMATION — ACT21

DISPLAY RECOMMENDED MENU — ACT22

ACQUIRE RECOMMENDED RECIPE INFORMATION — ACT23

DISPLAY RECOMMENDED RECIPE — ACT24

ACT25 UPDATE INSTRUCTION? — NO

YES

OUTPUT UPDATE INSTRUCTION — ACT26

END

STORE SYSTEM APPARATUS

CROSS-REFERENCE TO RELATED APPLICATION

This application is based upon and claims the benefit of priority from Japanese Patent Application No. 2023-020172, filed Feb. 13, 2023, the entire contents of which are incorporated herein by reference.

FIELD

Embodiments described herein relate generally to an information processing apparatus and method for a store system apparatus for handling of customer purchases.

BACKGROUND

In stores, such as supermarkets, there is an increasing number of systems that allows customers to register commodities by themselves as the customer moves around the stores. For such systems, there may be shopping cart mounted systems having commodity registration functions and self-scanning systems that use portable terminals owned by the customers themselves or portable terminals provided by the store. These different systems provide different possible environments for the provision of information to the customers during shopping according to the terminal types in use or available.

Accordingly, the provision of information for improving convenience of shopping in the stores with these different systems has been examined.

BRIEF DESCRIPTION OF THE DRAWINGS

FIG. 5 is a flowchart illustrating an example of a process by a processor of a terminal.

DETAILED DESCRIPTION

An example embodiment provides a technological solution for improving convenience of shopping in a store as compared to related art systems and apparatuses.

In general, a store system apparatus, such as a store server, includes a communication interface connectable to a terminal of a customer of a store, a storage unit storing or configured to store registration results of a plurality of customers, and a processor. The processor is configured to acquire position information of the terminal of the customer via the communication interface and output recommended commodity information via the communication interface to the terminal according to an area of the store corresponding to the acquired position information. The recommended commodity information indicates a recommended commodity that is in the area of the store. The processor is also configured to output registration summary information based on the stored registration results of the plurality of customers via the communication interface to the terminal.

Embodiment

Hereinafter, certain example embodiments will be described with reference to the drawings. In each drawing, depicted dimensions and number of units may be appropriately changed in some cases. In certain drawings, aspects may be omitted in some cases for the sake of clarity in description of other aspects.

Configuration Example

Figure 1:
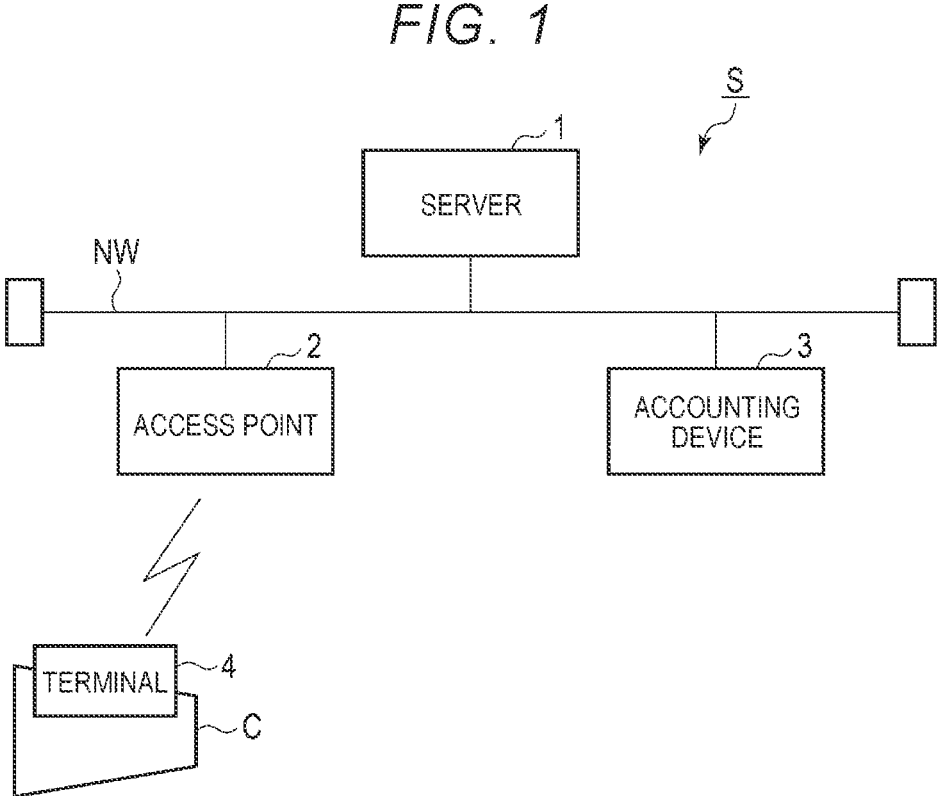
FIG. 1 is a block diagram of a store system according to an embodiment.

FIG. 1 is a block diagram illustrating an overview of a store system S.

The store system S includes a server 1, an access point 2, a checkout apparatus 3, and a terminal 4. The server 1, the access point 2, and the checkout apparatus 3 are communicably connected to each other via a network NW. The network NW can be a local area network (LAN) or the like. The LAN may be a wireless LAN or a wired LAN. In FIG. 1, one access point 2 is illustrated, but the store system S can include a plurality of access points 2. In FIG. 1, one checkout apparatus 3 is illustrated, but the store system S can include a plurality of checkout apparatuses 3. In FIG. 1, one terminal 4 is illustrated, but the store system S can include a plurality of terminals 4.

The server 1 is an apparatus that processes and manages information for the store. The server 1 is an example of an information processing apparatus.

The access point 2 is an apparatus capable of performing wireless communication with the terminal 4. The access point 2 relays communication between the server 1 and the terminal 4.

The checkout apparatus 3 ("accounting device") is an apparatus that processes payment for a commodity registered by a user using the terminal 4. The commodity registration is the registration of commodities that are to be purchased by the customer/user. The checkout apparatus 3 can process an offline-type payment such as a cash payment. The checkout apparatus 3 can process online-type payments using a credit card, a debit card, electronic money, a code settlement, accumulated reward points, or the like.

The terminal 4 is an apparatus that is used by a user (shopper) who does shopping in the store. The terminal 4 wirelessly communicates with the access point 2 and communicates with the server 1 via the access point 2. In some examples, terminal 4 may also or instead communicate with the server 1 via a network such as a mobile communication network or the Internet without involving the access point 2. The terminal 4 is mounted on a shopping cart C in this example. The shopping cart C is an example of a conveyance tool for carrying a commodity. The terminal 4 can be a tablet terminal or a smartphone, but is not limited thereto. The terminal 4 need not necessarily be mounted on the shopping cart C but may be held and manipulated by the user (shopper).

In an example of a store system S, the user does the shopping as follows. The user walks around the store pushing the shopping cart C on which the terminal 4 is mounted. The user performs commodity registration using the terminal 4. The user puts the registered commodity in the shopping cart C. When the user finishes the commodity registration, the user goes toward the checkout apparatus 3. The user pays for all the registered commodities at the checkout apparatus 3. In some examples, the terminal 4 stores in advance any one or a plurality of online noncash settlement methods such as credit settlement (payment with a credit card), settlement by a debit card, settlement by electronic money (payment with an electronic money medium), code settlement (payment using a QR-code or the like), points settlement (payment using accumulated points associated with a points card) as designated by the user. The terminal 4 may perform payment processing for the registered commodity upon user request to perform payment by the settlement method stored in advance on the terminal 4. In this case, the user can complete the payment using just the terminal 4 instead of using the checkout apparatus 3.

Figure 2:
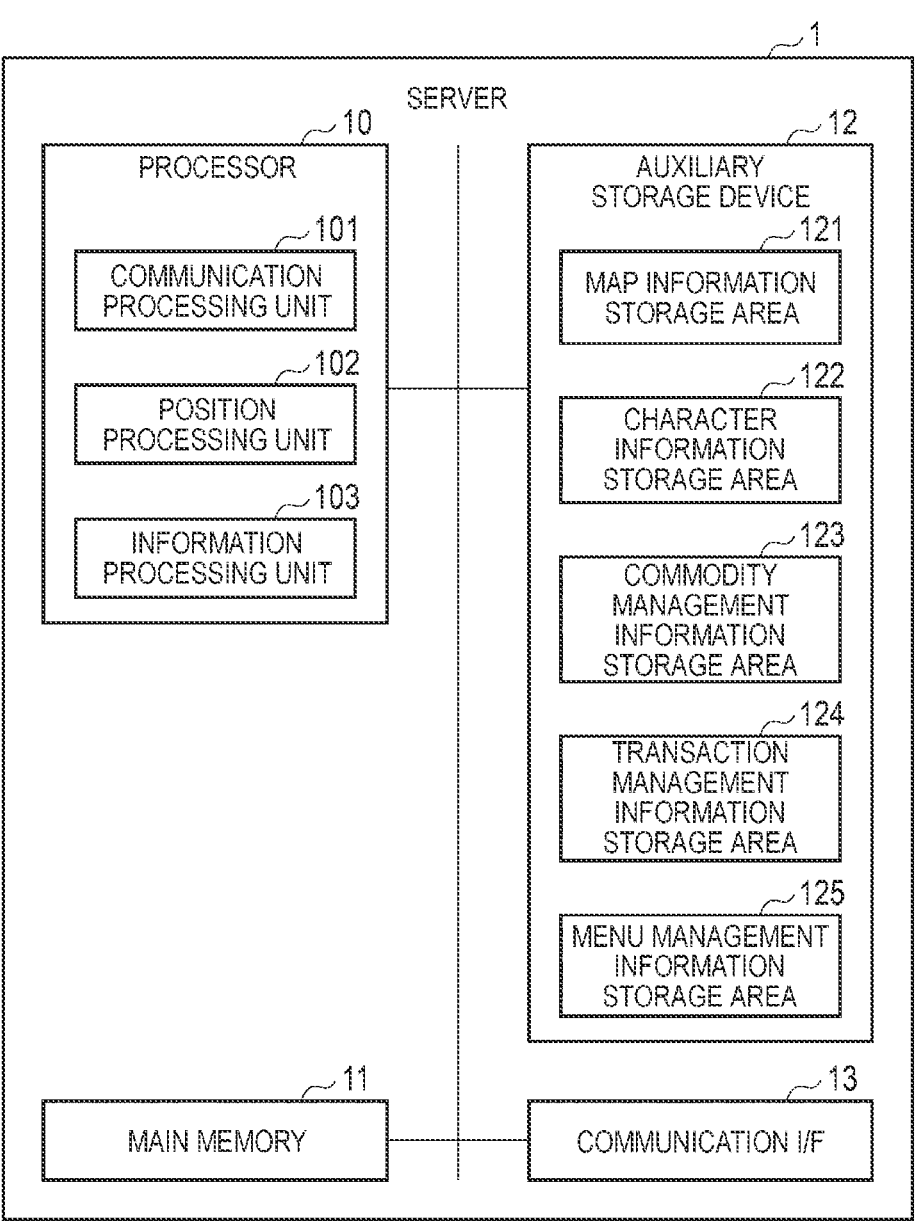
FIG. 2 is a block diagram of a server.

FIG. 2 is a block diagram illustrating an overview of the configuration example of the server 1.

The server 1 includes a processor 10, a main memory 11, an auxiliary storage device 12, and a communication interface 13. In FIG. 2, an interface is referred to as an "I/F".

The processor 10 corresponds to a central portion of the server 1. The processor 10 may be configured with a central processing unit (CPU) or the like. The processor 10 is an example of a processing circuit of the server 1. The processor 10 loads a program stored in advance in the main memory 11 or the auxiliary storage device 12 on the main memory 11. The program is a program that can cause the processor 10 to perform a process of each unit, which is described below, implemented by the processor 10. The processor 10 performs various processes by executing the program loaded on the main memory 11.

The main memory 11 corresponds to a main storage portion of the server 1. The main memory 11 includes a nonvolatile memory area and a volatile memory area. The main memory 11 stores an operating system or a program in the nonvolatile memory area. The main memory 11 uses the volatile memory area as a work area where data can be appropriately rewritten by the processor 10. For example, the main memory 11 includes a read only memory (ROM) as the nonvolatile memory area. For example, the main memory 11 includes a random access memory (RAM) as the volatile memory area.

The auxiliary storage device 12 corresponds to an auxiliary storage portion of the server 1. The auxiliary storage device 12 can be an electric erasable programmable read-only memory (EEPROM®), a hard disc drive (HDD), a solid state drive (SSD), or a flash memory, but is not limited thereto. The auxiliary storage device 12 stores the program, data used for the processor 10 to perform various processes, and data generated by the processes performed by the processor 10. The auxiliary storage device 12 is an example of a storage unit of the server 1.

The auxiliary storage device 12 includes a map information storage area 121. The map information storage area 121 stores map information. The map information is information providing an image of a map of the store. The map shows different areas of the store and characters related to the of areas. In this context, an "area" is an imaginary or arbitrarily defined area within the store. For example, an area can be set for each category of commodities available at the store. Thus, for example, the areas are set as "fruit," "vegetables," "fishery products," "meat," and the like, but areas are not limited thereto. The map includes one character for each defined area. The character can be set to have a high relevance to the corresponding area. Each character may have an appearance that evokes or reminds the shopper of a commodity related to each area. For example, a character related to a vegetables area may be a character resembling a vegetable. A character related to fishery products area may be a character resembling the staff of a fish shop (e.g., a fish monger). The characters can be cartoons, avatars, or the like but are not limited thereto. The map information can be updated appropriately with changes to store layout and/or product placements.

The auxiliary storage device 12 includes a character information storage area 122. The character information storage area 122 stores character information regarding each of the plurality of characters that may be depicted on the store map. The character information is information for displaying images of the characters. The character information is associated with a particular area. The character information can also be updated appropriately.

The auxiliary storage device 12 includes a commodity management information storage area 123. The commodity management information storage area 123 stores commodity management information regarding each of a plurality of commodities exhibited in the store. The commodity management information is information for managing commodities. The commodity management information includes a commodity code. The commodity code is commodity identification information with which a commodity can be uniquely identified. The commodity management information includes a name and a price of the commodity. The commodity information may include an image of the commodity. The commodity management information includes an exhibition area of commodities. The exhibition area is an area where commodities are displayed among the different areas of the store. The commodity management information includes information indicating whether a commodity is a recommended commodity. A recommended commodity is a commodity that is to be recommended to a user (shopper). The recommended commodities may be set by each store individually or may be set by the company that manages the store as part of a chain or the like. The plurality of areas of the store may include at least one area for which a recommended commodity is set. A plurality of recommended commodities can be set for different areas or within the same area. The plurality of areas of the store may include an area for which no recommended commodity is set. The commodity management information can be updated appropriately.

The auxiliary storage device 12 includes a transaction management information storage area 124. The transaction management information storage area 124 stores transaction management information regarding each of a plurality of transactions. The transactions in this context can be sales transactions for commodities. The transaction management information storage area 124 stores transaction management information of a paid transaction. In this context, "paid" means that shopping ends and the payment for the registered commodities has been completed. The transaction management information storage area 124 also stores transaction management information of an unpaid transaction. In this context, "unpaid" means that the shopping has not yet ended (is in progress) and payment for any currently registered commodities in the transaction has not been completed.

The transaction management information includes a transaction ID. The transaction ID is transaction identification information which is issued to the terminal 4 for each shopping event when use is started. Each transaction (shopping event) can be uniquely identified by the transaction ID. The transaction management information includes a terminal ID. The terminal ID is terminal identification information with which the terminal 4 used for shopping can be uniquely identified. The transaction management information of the paid transaction includes a commodity code of each purchased commodity. "Purchased" corresponds to the "paid" in this context. The purchased commodity is a commodity for which the customer has already paid (completed settlement/checkout). The transaction management information of the paid transaction includes the number of items purchased for each of the purchased commodities. The transaction management information of the unpaid transaction includes a commodity code of each registered commodity during the registration (shopping) process. In this context "during the registration (shopping) process" refers to the period after a first commodity is registered using the terminal 4 but before payment. The registration (shopping) process may also be ended by a returning process without completion of the payment process. The transaction management information of the unpaid transaction includes the number of items registered during registration. The transaction management information of the unpaid transaction includes a shopping memo. The shopping memo is data about one or more commodities scheduled to be purchased during the shopping event. The shopping memo may be set in advance by the user such as for a reminder to purchase certain items. The shopping memo includes a commodity code of commodities to be purchased as set by the user.

The auxiliary storage device 12 includes a menu management information storage area 125. The menu management information storage area 125 stores menu management information regarding each of a plurality of possible menus (dishes). In this context, "menu" refers to a dish cooked with a plurality of ingredients. The menu management information may include a name of the menu (dish), an image of the menu (dish), and a recipe for making the menu (dish). In this context, "recipe" includes information regarding the ingredients required or recommended for making the menu (dish) and information regarding required amounts of the listed ingredients. In addition, the recipe may include a procedure for making the menu (dish) using the ingredients. The menu management information includes a commodity code of each of the commodities corresponding to the listed ingredients for making the menu (dish).

The communication interface 13 is an interface that communicably connects the server 1 to another apparatus. The communication interface 13 is an example of a communication unit of the server 1.

Above-described components of the server 1 may be omitted or varied and additional components may be included as appropriate.

The processor 10 implements a communication processing unit 101, a position processing unit 102, and an information processing unit 103 by executing software. Each unit implemented by the processor 10 can also be referred to as a function or a functional unit. Each unit implemented by the processor 10 can also be considered as implemented by a control unit including the processor 10 and the main memory 11.

The communication processing unit 101 processes communication with the terminal 4 via the communication interface 13. The communication processing unit 101 outputs information to the terminal 4 via the communication interface 13. The communication processing unit 101 acquires information from the terminal 4 via the communication interface 13.

The position processing unit 102 chronologically acquires positional information of the terminal 4. The positional information of the terminal 4 is information indicating a position of the terminal 4 in the store. The position processing unit 102 may acquire the positional information of the terminal 4 based on the fact that the communication processing unit 101 acquires the positional information of the terminal 4 from the terminal 4. If the store system S includes a plurality of cameras, the position processing unit 102 may acquire the positional information of the terminal 4 based on data captured by the plurality of cameras.

The information processing unit 103 performs various types of information processing.

Figure 3:
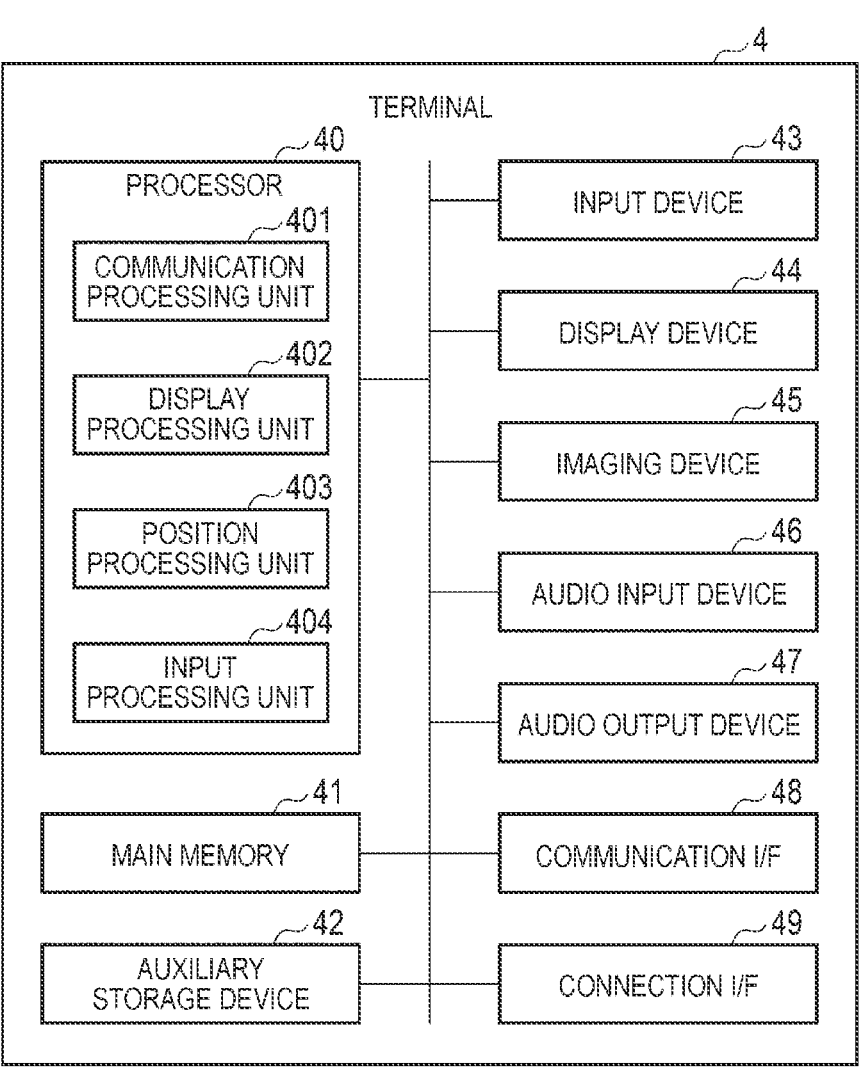
FIG. 3 is a block of a terminal.

FIG. 3 is a block diagram illustrating an overview of the configuration example of the terminal 4.

The terminal 4 includes a processor 40, a main memory 41, an auxiliary storage device 42, an input device 43, a display device 44, a capturing device 45, an audio input device 46, an audio output device 47, a communication interface 48, and a connection interface 49. In FIG. 3, an interface is referred to as an "I/F".

The processor 40 corresponds to a central portion of the terminal 4. The processor 40 is configured with a CPU or the like. The processor 40 is an example of a processing circuit of the terminal 4. The processor 40 loads a program stored in advance in the main memory 41 or the auxiliary storage device 42 on the main memory 41. The program is a program that can cause the processor 40 to perform a process of each unit, which is described below, implemented by the processor 40. The processor 40 performs various processes by executing the program loaded on the main memory 41.

The main memory 41 corresponds to a main storage portion of the terminal 4. The main memory 41 includes a nonvolatile memory area and a volatile memory area. The main memory 41 stores an operating system and/or a program in the nonvolatile memory area. The main memory 41 uses the volatile memory area as a work area where data can be appropriately rewritten by the processor 40. For example, the main memory 41 includes a ROM as the nonvolatile memory area. For example, the main memory 41 includes a RAM as the volatile memory area.

The auxiliary storage device 42 corresponds to an auxiliary storage portion of the terminal 4. The auxiliary storage device 42 is an EEPROM, an HDD, an SSD, or a flash memory, but an exemplary embodiment is not limited thereto. The auxiliary storage device 42 stores the program, data used for the processor 40 to perform various processes, and data generated by the processes performed by the processor 40. The auxiliary storage device 42 is an example of a storage unit of the terminal 4.

The input device 43 can be any device capable of receiving a user input operation and outputting an instruction based on a user input operation. The input device 43 may include a button which can be pressed. The input device 43 may include a touch panel integrated with the display device 44. The input device 43 is an example of an input unit of the terminal 4.

The display device 44 is a device capable of displaying various images. The display device 44 is a liquid crystal display or an organic electroluminescence (EL) display, but an exemplary embodiment is not limited thereto. The display device 44 is an example of a display unit of the terminal 4.

The capturing device 45 is a device capable of acquiring image data by capturing an image. For example, the capturing device 45 is a camera.

The audio input device 46 is a device capable of inputting audio. For example, the audio input device 46 is a microphone. The audio input device 46 is an example of an input unit of the terminal 4.

The audio output device 47 is a device capable of outputting audio. For example, the audio output device 47 is a speaker. The audio output device 47 is an example of an output unit of the terminal 4.

The communication interface 48 includes an interface communicably connecting the terminal 4 to another apparatus. The communication interface 48 may include an interface capable of receiving a beacon signal. The communication interface 48 may include an interface capable of receiving a global positioning system (GPS) signal. The communication interface 48 is an example of a communication unit of the terminal 4.

The connection interface 49 is an interface capable of connecting a device. For example, the device is a scanner. The scanner is a device capable of reading information recorded on a code symbol such as a barcode symbol or a two-dimensional code symbol.

Above-described components of the terminal 4 may be omitted or varied and additional components may be added as appropriate.

The processor 40 implements a communication processing unit 401, a display processing unit 402, a position processing unit 403, and an input processing unit 404 by executing software. Each unit implemented by the processor 40 can also be referred to as a function or a functional unit. Each unit implemented by the processor 40 can also be considered as implemented by a control unit including the processor 40 and the main memory 41.

The communication processing unit 401 processes communication with the server 1 via the communication interface 48. The communication processing unit 401 outputs information to the server 1 via the communication interface 48. The communication processing unit 401 acquires information from the server 1 via the communication interface 48.

The display processing unit 402 displays an image on the display device 44.

The position processing unit 403 chronologically acquires positional information of the terminal 4. The position processing unit 403 may acquire the positional information of the terminal 4 based on the beacon signal received by the communication interface 48. In this example, a transmitter that transmits a beacon signal indicating an area is provided in each of a plurality of areas of the store. In this example, the communication interface 48 receives the beacon signal transmitted from the transmitter in accordance with an area where the terminal 4 is located. The position processing unit 403 may acquire the positional information of the terminal 4 based on the GPS signal received by the communication interface 48.

The input processing unit 404 detects an input based on a user operation via the input device 43.

Operation Example

Next, processes of the processor 10 and the processor 40 will be described.

The order of processing described below are examples and the order of process may be varied. In other examples, described steps can be appropriately omitted or substituted, and steps may be added and still be in accordance with an embodiment.

Figure 4:
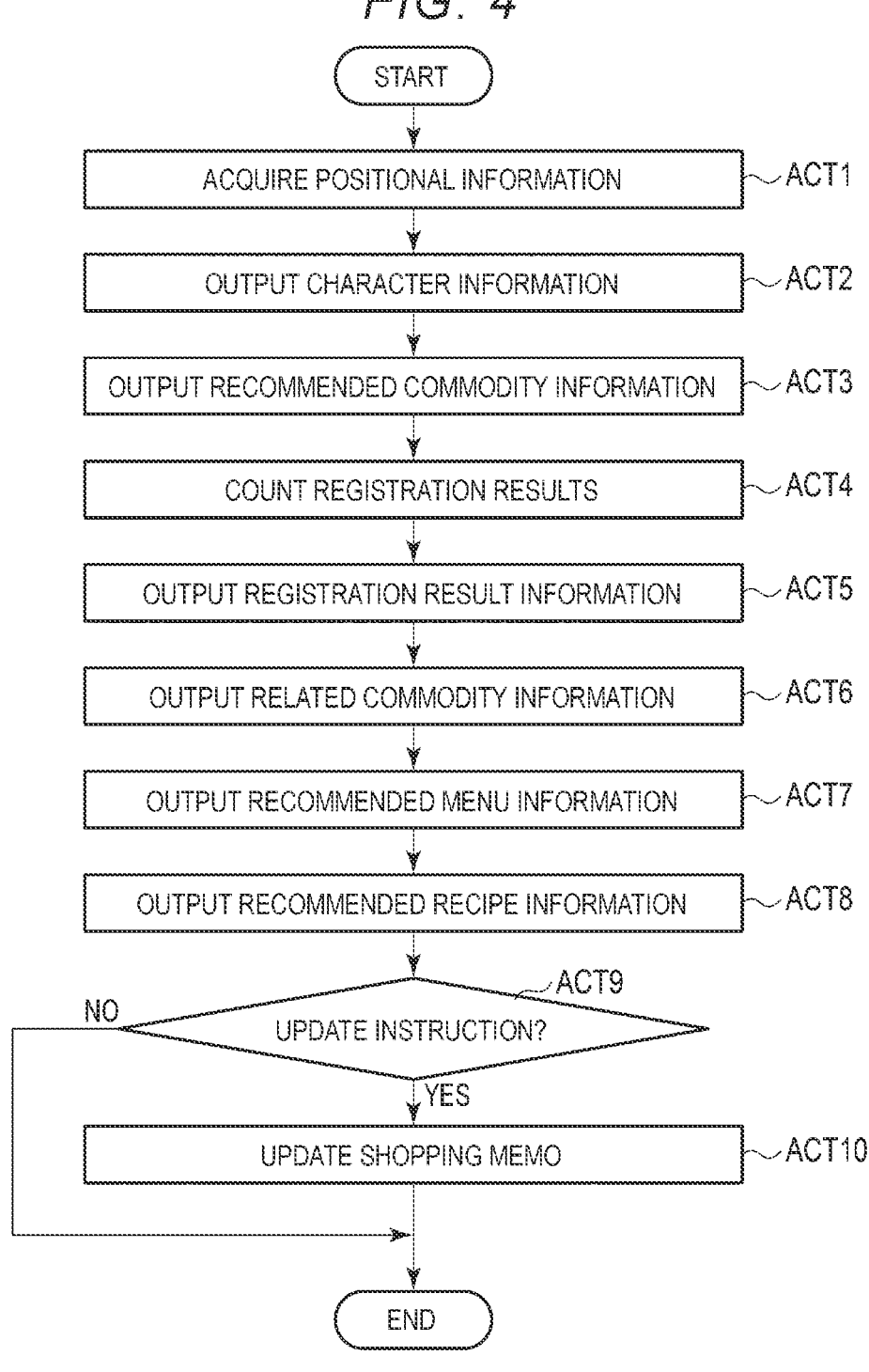
FIG. 4 is a flowchart illustrating an example of a process by a processor of a server.

FIG. 4 is a flowchart illustrating an example of the process by the processor 10 of the server 1.

The position processing unit 102 acquires the positional information of the terminal 4 (ACT 1).

The communication processing unit 101 outputs character information in accordance with an area of a position indicated by the positional information of the terminal 4 among the plurality of characters to the terminal 4 (ACT 2). In ACT 2, for example, the position processing unit 102 detects the area of the position indicated by the positional information of the terminal 4 based on the positional information of the terminal 4. The information processing unit 103 acquires character information associated with the area of the position indicated by the positional information of the terminal 4 from the character information storage area 122 based on the detection of the area by the position processing unit 102. The communication processing unit 101 outputs the character information acquired by the information processing unit 103 to the terminal 4. The character information is an example of information regarding a character for displaying the character on the display device 44 of the terminal 4.

The position processing unit 102 can detect a change in the area of the position indicated by the positional information of the terminal 4 based on the positional information of the terminal 4. For example, the position processing unit 102 detects movement of the position indicated by the positional information of the terminal 4 from a first area to a second area different from the first area. The position processing unit 102 detects a change in the area from the first area to the second area based on the detection of the movement of the position from the first area to the second area. The communication processing unit 101 outputs character information in accordance with the second area based on the change in the area after output of the character information in accordance with the first area.

The communication processing unit 101 outputs recommended commodity information in the area of the position indicated by the positional information of the terminal 4 among the plurality of areas of the store, to the terminal 4 (ACT 3). In ACT 3, for example, the information processing unit 103 generates the recommended commodity information based on information stored in the commodity management information storage area 123. The recommended commodity information is information regarding a recommended commodity. The recommended commodity information includes a name and a price of the recommended commodity. The recommended commodity information may include an image of the recommended commodity. In this example, the information processing unit 103 retrieves the recommended commodity in the area detected by the position processing unit 102 based on the exhibition area included in the commodity management information and information indicating whether the commodity is the recommended commodity. The information processing unit 103 acquires the name and the price of the commodity included in the commodity management information corresponding to the retrieved recommended commodity as the name and the price of the recommended commodity. The information processing unit 103 may acquire the image of the commodity included in the commodity management information corresponding to the retrieved recommended commodity as the image of the recommended commodity.

Immediately after the position processing unit 102 detects that the terminal 4 enters a certain area, the communication processing unit 101 may output the recommended commodity information in the area to the terminal 4. After a predetermined time elapses after the position processing unit 102 detects that the terminal 4 enters a certain area, the communication processing unit 101 may output the recommended commodity information in the area to the terminal 4. As described above, the position processing unit 102 can detect a change in the area of the position indicated by the positional information of the terminal 4 based on the positional information of the terminal 4. Therefore, after the recommended commodity information in the first area is output, the communication processing unit 101 outputs the recommended commodity information in the second area based on the change in the area. The recommended commodity information is an example of information regarding the recommended commodity for displaying the recommended commodity on the display device 44 of the terminal 4.

The information processing unit 103 counts registration results of other users with regard to the recommended commodity in the area of the position indicated by the positional information among the plurality of areas of the store (ACT 4). Expression of the "other users" is assumed to be one or more other users different from the user unless otherwise mentioned. The registration result is a result related to the registration of the commodity. In ACT 4, for example, the information processing unit 103 counts the registration results of the other users based on information stored in the transaction management information storage area 124. The information processing unit 103 may count the registration results of the other users at a time at which the information processing unit 103 counts the registration results.

The registration result can include results during registration of the other users. The result during the registration can include existence of the other users who are registering the recommended commodities. The result during the registration can include the number of the other users who are registering the recommended commodities. The result during the registration can include the number of recommended commodities during the registration of the other users.

The information processing unit 103 counts the results during the registration of the other users based on the information stored in the transaction management information storage area 124. In this example, a commodity code of a commodity included in the commodity management information corresponding to the recommended commodity is acquired as a commodity code of the recommended commodity. The information processing unit 103 counts the number of records of the transaction management information of an unpaid transaction in which the commodity code of the recommended commodity is included as a commodity code of the registration commodity during the registration. The information processing unit 103 counts existence of the other users who are registering the recommended commodities by counting the number of records of the transaction management information of the unpaid transaction in which the commodity codes of the recommended commodities are included. The information processing unit 103 counts the number of records of the transaction management information of the unpaid transaction in which the commodity codes of the recommended commodities are included, as the number of the other users who are registering the recommended commodities. The information processing unit 103 counts the number of registered recommended commodities with regard to each piece of transaction management information of the unpaid transaction in which the commodity codes of the recommended commodities are included as the commodity codes of the registration commodities during the registration. The information processing unit 103 counts a sum of the number of registered recommended commodities as the number of recommended commodities during the registration of the other users.

The registration results can include purchase results of the other users. Since the purchased commodities are paid commodities after the commodity registration, the purchase results are included in the registration results. The purchase results can include existence of the other users who finish purchasing the recommended commodities. The purchase results can include the number of the other users who finished purchasing the recommended commodities. The purchase results can include the number of recommended commodities purchased by the other users. The purchase results are results during a period from a first time point to a second time point. The first time point may be when the store opens or some other set time amount before the second time point. The second time point may be when the information processing unit 103 counts the registration results.

The information processing unit 103 counts the purchase results of the other users based on the information stored in the transaction management information storage area 124. In this example, a commodity code of a commodity included in the commodity management information corresponding to the recommended commodity is acquired as the commodity code of the recommended commodity. The information processing unit 103 counts the number of records of the transaction management information of the paid transaction in which the commodity codes of the recommended commodities are included as commodity codes of the purchased commodities. The information processing unit 103 counts existence of the other users who finish purchasing the recommended commodities by counting the number of records of the transaction management information of the paid transaction in which the commodity codes of the recommended commodities are included. The information processing unit 103 counts the number of records of the transaction management information of the paid transaction in which the commodity codes of the recommended commodities are included as the commodity codes of the purchased commodities, as the number of the other users who finish purchasing the recommended commodities. The information processing unit 103 counts the number of purchased recommended commodities with regard to the transaction management information of the paid transaction in which the commodity codes of the recommended commodities are included as the commodity codes of the purchased commodities. The information processing unit 103 counts a sum of the number of purchased recommended commodities as the number of recommended commodities purchased by the other users.

The registration results can include results in which the results during the registration of the other users and the purchase results of the other users are combined. Hereinafter, the results in which the results during the registration of the other users and the purchase results of the other users are combined are also referred to as sum results. The sum results can include existence of the other users who are registering the recommended commodities or finish purchasing the recommended commodities. The sum results can include a sum of the number of the other users who are registering the recommended commodities and the number of the other users who finish purchasing the recommended commodities. The sum results can include a sum of the number of recommended commodities during the registration of the other users and the number of recommended commodities purchased by the other users. The information processing unit 103 counts the sum results by counting the results during the registration of the other users and the purchase results of the other users, as described above.

The information processing unit 103 may count the registration results of the other users based on information regarding one store. The information processing unit 103 may count the registration results of the other users based on information regarding a plurality of stores.

The communication processing unit 101 outputs registration result information to the terminal 4 (ACT 5). In ACT 5, for example, the information processing unit 103 generates the registration result information based on the counted registration results of the other users. The registration result information is information regarding the registration results of the other users with regard to the recommended commodities. The registration result information includes the registration results of the other users counted by the information processing unit 103. The registration result information is an example of information regarding the registration results for displaying the registration results on the display device 44 of the terminal 4.

The communication processing unit 101 outputs related commodity information to the terminal 4 (ACT 6). The related commodity information is information regarding related commodities having the registration results of the other users. The related commodities are commodities different from the recommended commodities. Expression of the "related commodities" is assumed to indicate one or more related commodities unless otherwise mentioned. The related commodities are examples of other commodities different from the recommended commodities. The related commodity information includes a name and a price of the related commodity. The related commodity information may include an image of the related commodity. The related commodity information may include the number of items based on registration results of the related commodities. The related commodity information may include the number of the other users based on the registration results of the related commodities.

If the registration results of the other users include the results during the registration of the other users, the related commodities having the registration results of the other users include related commodities during the registration of the other users. If the registration results of the other users include the purchase results of the other users, the related commodities having the registration results of the other users include related commodities purchased by the other users. If the registration results of the other users include sum results, the related commodities having the registration results of the other users include the related commodities during the registration of the other users and the related commodities purchased by the other users.

In ACT 6, the information processing unit 103 generates the related commodity information based on the information stored in the commodity management information storage area 123 and the transaction management information storage area 124. The information processing unit 103 may generate the related commodity information when the information processing unit 103 counts the registration results. The communication processing unit 101 outputs the related commodity information generated by the information processing unit 103 to the terminal 4. The related commodity information is an example of information regarding the related commodities for displaying the related commodities on the display device 44 of the terminal 4.

An example in which the related commodities having the registration results of the other users include the related commodities during the registration of the other users will be described. In this example, the information processing unit 103 retrieves the transaction management information of an unpaid transaction in which the commodity codes of the recommended commodities are included from the transaction management information storage area 124. The information processing unit 103 retrieves the commodity codes of the registered commodities different from the recommended commodities for the unpaid transaction. The information processing unit 103 acquires, for each related commodity, the name and the price of the commodity included in the commodity management information corresponding to the retrieved commodity code. The information processing unit 103 may acquire, for each related commodity, an image of the commodity included in the commodity management information.

The information processing unit 103 counts, for each related commodity, the number of already registered related commodities in an unpaid transaction. The information processing unit 103 may count the number of registered related commodities. The information processing unit 103 may count, for each related commodity, the number of the other users with related commodities.

An example concerning related commodities purchased by other users will be described. In this example, the information processing unit 103 retrieves the transaction management information of the paid transactions in which the commodity codes of the recommended commodities are included in the transaction management information storage area 124. The information processing unit 103 retrieves the commodity codes of the purchased commodities different from the recommended commodities as the commodity codes of the related commodities from each paid transaction. The information processing unit 103 then acquires, for each related commodity, the name and the price corresponding to the related commodity. The information processing unit 103 may acquire an image of the commodity included in the commodity management information corresponding to the related commodity.

The information processing unit 103 counts the number of registered related commodities for each paid transaction. The information processing unit 103 may count the sum of the number of registered related commodities in a paid transaction. The information processing unit 103 may count, for each related commodity, the number of paid transactions in which the commodity codes of the related commodities are included. The counted number of paid transactions with related commodities may be considered as the number of other users who purchased related commodities.

An example in which the related commodities registered by the other users in either current (on-going) transactions or completed (paid) transactions will be described. In this example, the information processing unit 103 may check for related commodities that have been registered by other users in an on-going (still unpaid) transaction and/or in a completed transaction.

The information processing unit 103 outputs recommended menu information to the terminal 4 (ACT 7). The recommended menu information is information regarding a recommended menu based on recommended commodities and other commodities either already registered or otherwise. The recommended menu information may include a name of the recommended menu (dish). The recommended menu information may include an image of the recommended menu (dish). The recommended menu is a dish or the like in which a recommended commodity and at least one other related commodity are used in combination. If the recommended commodity is a bamboo shoot and the related commodity may be a cucumber, the recommended menu may be a "Zha Jiang Mian" dish. If the recommended commodity is a bamboo shoot and the related commodity is pork, the recommended menu may be a "Chinjao Rosu" dish. Expression of the "recommended menu" may indicate one or more dishes unless otherwise mentioned. The recommended menu is an example of a purchase reason for the recommended commodity.

In ACT 7, the information processing unit 103 generates the recommended menu information based on information stored in the menu management information storage area 125. In this example, the information processing unit 103 retrieves the menu management information matching the commodity code of the recommended commodity and at least one related commodity. The information processing unit 103 acquires a name of a menu included in the menu management information for the recommended menu. Multiple recommended menus may be retrieved. The information processing unit 103 acquires an image of the of the recommended menu. The communication processing unit 101 outputs the recommended menu information to the terminal 4. The recommended menu information is an example of information for displaying the recommended menu on the display device 44 of the terminal 4.

The communication processing unit 101 outputs recommended recipe information to the terminal 4 (ACT 8). The recommended recipe information is information regarding a recommended recipe. The recommended recipe information includes the recommended recipe. The recommended recipe is a recipe for the recommended menu. The recommended recipe includes a plurality of ingredients for making the recommended menu. The plurality of ingredients include the recommended commodity and the related commodity. The recommended recipe also includes amounts of the ingredients required or suggested for making the recommended menu. The recommended recipe may include a step-by-step procedure for making the recommended menu using the ingredients. The term "recommended recipe" is assumed in this context to refer to one or more recommended recipes unless otherwise mentioned.

In ACT 8, the information processing unit 103 generates the recommended recipe information based on the information stored in the menu management information storage area 125. In this example, the information processing unit 103 acquires, for each recommended menu, the recipe included in the menu management information. The communication processing unit 101 outputs the recommended recipe information to the terminal 4. The recommended recipe information is an example of information for displaying the recommended recipe on the display device 44 of the terminal 4.

The communication processing unit 101 may output the recommended recipe information for multiple dishes to the terminal 4 without requiring a separate instruction from the terminal 4. Based on an instruction to display the recommended recipe from the terminal 4, the communication processing unit 101 may output the recommended recipe information to the terminal 4. The instruction to display the recommended recipe can be an instruction to display one recommended recipe selected by the user on the display device 44 from among multiple options. The instruction to display the recommended recipe is an instruction input via the input device 43 of the terminal 4 based on a user operation.

The communication processing unit 101 acquires an instruction to update the shopping memo from the terminal 4 (ACT 9). The instruction to update the shopping memo is an instruction to add commodities corresponding to the ingredients included in a selected recommended recipe to the shopping memo. The instruction to update the shopping memo is an instruction input via the input device 43 based on a user operation.

When the communication processing unit 101 acquires the instruction to update the shopping memo from the terminal 4 (YES in ACT 9), the process transitions from ACT 9 to ACT 10. If the communication processing unit 101 does not acquire the instruction to update the shopping memo from the terminal 4 (NO in ACT 9), the process ends.

The information processing unit 103 updates the shopping memo (ACT 10). The updating of the shopping memo includes addition of the commodities corresponding to the ingredients included in the recommended recipe to the shopping memo. In ACT 10, for example, the information processing unit 103 retrieves menu management information corresponding to the selected recommended recipe from the menu management information storage area 125. The information processing unit 103 adds the commodity codes corresponding to the plurality of ingredients to the shopping memo.

As described above, the server 1 can output the recommended commodity information for the area indicated by the positional information of the terminal 4.

Since the server 1 can provide information regarding a recommended commodity that is within an area where the user is presently located, the user can find the recommended commodity without walking around the store. Therefore, the server 1 can improve convenience of shopping in the store.

As described above, the server 1 can output the registration result information of the other users with regard to the recommended commodity.

The server 1 can operate to motivate the user to purchase the recommended commodity by providing information regarding the registration results of the other users. Therefore, the server 1 can improve convenience of shopping in the store.

For example, other users can register the recommended commodities and the server 1 can provide the number of other users who are registering the recommended commodities or the number of recommended commodities that have been registered by the other users. The server 1 can provide information regarding the real-time purchase actions by utilizing transaction information of on-going (unpaid) transactions.

For example, other users can purchase the recommended commodities and the server 1 can provide the number of the other users who purchased the recommended commodities or the number of recommended commodities purchased by other users. The server 1 can provide highly accurate information regarding the purchase actions by utilizing information regarding completed transactions.

As described above, the server 1 can output the related commodity information to the terminal 4.

The server 1 can provide information regarding the related commodities that have been purchased or have been registered for purchased by other users in conjunction with the recommended commodities. The user can easily ascertain items which are typically desired to be purchased together with the recommended commodity. Therefore, the server 1 can improve convenience of shopping in the store.

As described above, the server 1 can output the recommended menu information based on the recommended commodity and the related commodity to the terminal 4.

When cooking a dish, a plurality of food ingredients for cooking the dish must be collectively purchased in most cases. The server 1 can determine or select the recommended menu from the recommended commodity and the related commodities, and thus can propose a menu that would require the recommended commodity. Since the recommended menu is selected based on what the other users are actually trying to make, the user clearly ascertains a use for the recommended commodity. Therefore, the server 1 can improve convenience of shopping in the store.

As described above, the server 1 can output the recommended recipe information for the recommended menu to the terminal 4.

The server 1 can recommend the other commodities necessary to make the recommended menu besides the recommended commodity by providing the recommended recipe to the user considering purchase of the recommended commodity. The user clearly ascertains the other required commodities besides the recommended commodity. Therefore, the server 1 can improve convenience of shopping in the store.

FIG. 5 is a flowchart illustrating an example of processing by the processor 40 of the terminal 4.

The position processing unit 403 acquires positional information of the terminal 4 (ACT 11).

The communication processing unit 401 outputs the positional information to the server 1 (ACT 12).

The communication processing unit 401 acquires, from the server 1, the character information corresponding to the positional information (ACT 13).

The display processing unit 402 displays the character based on the character information (ACT 14). The display processing unit 402 displays a first character for a first area, and then erases the display of the first character based on a change in position from the first area to the second area. The display processing unit 402 erases the display of the first character, and then displays the second character corresponding to the second area.

The communication processing unit 401 acquires the recommended commodity information from the server 1 for the area indicated by the positional information of the terminal 4 (ACT 15).

The display processing unit 402 displays the recommended commodity on the display device 44 for the area indicated by the positional information based on the recommended commodity information (ACT 16). The display processing unit 402 may display the character, and then display the recommended commodity on the display device 44. The display of the recommended commodity may include display of the name of the recommended commodity. The display of the recommended commodity may include display of the price of the recommended commodity. The display of the recommended commodity may include display of an image of the recommended commodity.

The communication processing unit 401 acquires the registration result information from the server 1 for other users as related to the recommended commodity (ACT 17).

The display processing unit 402 displays the corresponding registration results of other users (ACT 18). The display processing unit 402 may display the registration results at the same time as a display of the recommended commodities on the display device 44. The display processing unit 402 may display the recommended commodities, and then display the registration results of other users on the display device 44.

The display of the registration results of the other users may include display indications or summaries of on-going transaction commodity registrations and/or completed transactions of other users. The indications of on-going transaction may include display of the existence of the other users who have registered the recommended commodities, or the number of the other users who have registered the recommended commodities in on-going transactions or completed transactions. The display of the results may include display of the number of recommended commodities that have been registered for purchase by other users or the number of recommended commodities that have already been purchased.

The communication processing unit 401 acquires related commodity information from the server 1 (ACT 19).

The display processing unit 402 displays as the related commodities those that were registered (or commonly so) by other users who also purchased (or have registered for purchase) the recommended commodity (ACT 20). The display processing unit 402 may display the related commodities at the same time as the recommended commodities on the display device 44. The display processing unit 402 may display the recommended commodities, and then display the related commodities on the display device 44.

The display of the related commodities may include display of the names of the related commodities. The display of the related commodities may include display of prices of the related commodities. The display of the related commodities may include display of images of each related commodity. The display of the related commodities may include display of the frequency of common purchase with the recommended commodity based on the registration results of the other users. The display of the related commodities may include display of the number of the other users purchasing each of the related commodities in conjunction with the recommended commodity. The display processing unit 402 may display the related commodities on the display device 44 by arranging the related commodities in order of frequency of common purchase based on the registration results of the related commodities. The display processing unit 402 may display the related commodities on the display device 44 by arranging the related commodities in order of the number of the other users who purchased the related commodity.

The communication processing unit 401 acquires the recommended menu information from the server 1 (ACT 21).

The display processing unit 402 displays the recommended menu based on the recommended commodity (or commodities) and the related commodities on the display device 44 (ACT 22). The display processing unit 402 may display the recommended menu at the same time as the related commodities on the display device 44. The display processing unit 402 may display the related commodities, and then display the recommended menu on the display device 44.

The display of the recommended menu may include display of the name of the recommended menu. Multiple options may be presented to the shopper/user to permit the shopper/user to select a recommended menu. The display of the recommended menu may include display of an image of the recommended menu. The display processing unit 402 may display a button by which an instruction to display the recommended recipe for the recommended menu can be input. The button allows the user to select a recommended recipe using the input device 43. The recommended menu may be displayed separately from the button or may be displayed on the button. In the former case, a display of the recommended menu may overlap partially a display of the button or may be apart from the button.

The communication processing unit 401 acquires the recommended recipe information from the server 1 (ACT 23).

The display processing unit 402 displays the recommended recipe on the display device 44 (ACT 24). In ACT 24, for example, the input processing unit 404 detects the input of an instruction to display the recommended recipe via the input device 43 based on a user operation. Here, it is assumed that the user selects the button of the recommended recipe from multiple options using the input device 43. The display processing unit 402 then displays the selected recommended recipe on the display device 44.

The display of the recommended recipe may include display of the ingredients for making the recommended menu. The display of the ingredients is an example of display of a plurality of commodities including the recommended commodities and the related commodities for a recommended menu. The display of the recommended recipe may include display of quantities of the ingredients required for making the recommended menu. The display of the recommended recipe may include display of process steps by which the recommended menu can be made. The display processing unit 402 may display a button by which an instruction to update the shopping memo to incorporate the recommended recipe can be input. The button can be selected using the input device 43.

The input processing unit 404 detects an input of the instruction to update the shopping memo via the input device 43 based on a user operation (ACT 25). If the input processing unit 404 detects the input of the instruction to update the shopping memo (YES in ACT 25), the process transitions from ACT 25 to ACT 26. If the input processing unit 404 does not detect the input of the instruction to update the shopping memo (NO in ACT 25) within some amount of time or the like, the process ends.

The communication processing unit 401 outputs the instruction to update the shopping memo to the server 1 based on the input of the instruction to update the shopping memo (ACT 26).

As described above, the terminal 4 can display the recommended commodity for an area indicated by the positional information of the terminal 4 on the display device 44.

Since the terminal 4 can display the recommended commodity according to the area in which the user (terminal 4) is located, the user can find the recommended commodity without walking around the store. Therefore, the server 1 can improve convenience of shopping in the store.

As described above, the terminal 4 can be used to display information related to the registration results of other users who purchased, or registered for purchase, a recommended commodity.

The user can be motivated to purchase a recommended commodity by providing the registration results of the other users. Therefore, the terminal 4 can improve convenience of shopping in the store.

For example, when many other users register the recommended commodities, the terminal 4 can display the number of the other users who are registering the recommended commodities or the number of recommended commodities that have been registered by the other users. The terminal 4 can thus display a real-time tally of purchase action of other users to promote sales of a recommended commodity.

For example, the terminal 4 can provide the number of the other users who purchased recommended commodities or the number of recommended commodities purchased by the other users.

As described above, the terminal 4 can also display a related commodity on the display device 44. A related commodity is a commodity that might be typically purchased in conjunction with a recommended commodity (e.g., hot dog buns may be considered to be a related commodity for a recommended package of hot dogs).

The terminal 4 can display the related commodities that are often purchased together with a recommended commodity by the other users. Thus, if the user purchases the recommended commodity, the user can easily ascertain another desirable commodity to go with the recommended commodity. Therefore, the terminal 4 can improve convenience of shopping in the store.

As described above, the terminal 4 can display a recommended menu based on the recommended commodity on the display device 44. The recommended menu may be determined in conjunction with related commodities of a recommended commodity.

When cooking a dish, the plurality of food ingredients for cooking the dish may be collectively purchased in many cases. The recommended menu is based on the recommended commodity and the related commodities, and thus the terminal 4 can display a menu (dish) using the recommended commodity. Since the recommended menu is a dish that the other users are actually trying to make, the user clearly ascertains a use for recommended commodity. Therefore, the terminal 4 can improve convenience of shopping in the store.

As described above, the terminal 4 can display the recommended recipe for the recommended menu on the display device 44.

The terminal 4 can recommend additional commodities necessary to make the recommended menu besides the recommended commodity by displaying the recommended recipe to the user. The user clearly ascertains the required commodities other than the recommended commodity. Therefore, the terminal 4 can improve convenience of shopping in the store.

A display example of a character in the terminal 4 will be described.

Figure 6:
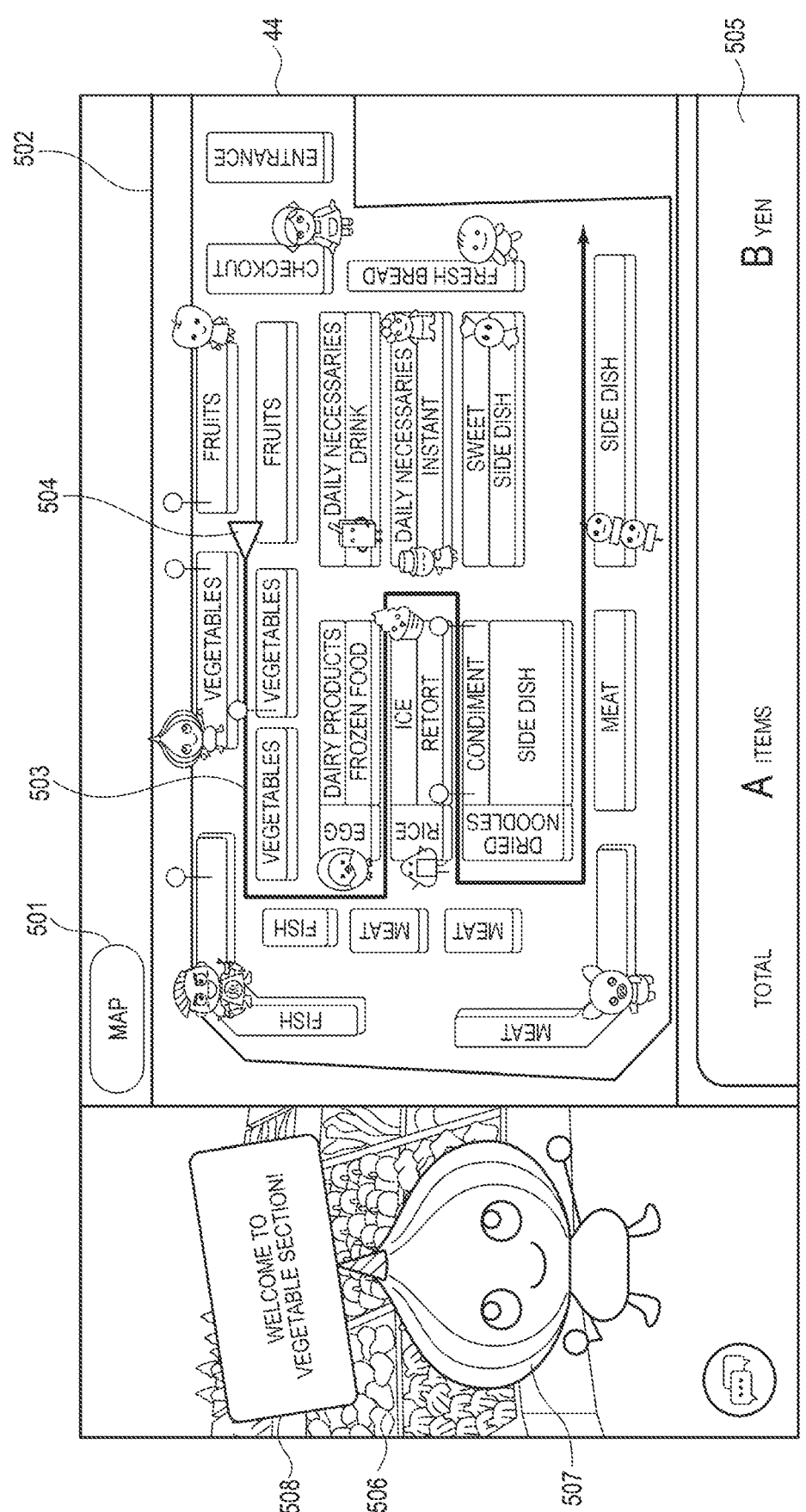
FIG. 6 is a diagram illustrating a display example of a character on a terminal.

FIG. 6 is a diagram illustrating a display example of a character 507 in the terminal 4.

In FIG. 6, the terminal 4 is assumed to be the vegetables area.

The display device 44 displays a map display button 501 by which an instruction to display a map can be input. The display device 44 displays a map 502 based on map information. The map 502 shows a plurality of areas of a store and a plurality of characters corresponding to the plurality of areas of the store. For example, the map 502 displays a character resembling a vegetable for the area of vegetables. For example, the map 502 displays a character resembling a fish shop staffer for the area of fishery products. The display device 44 displays a route 503 on the map 502. The route 503 is a route on which the current location 504 is a start point for picking up one or more commodities scheduled to be purchased as included in the shopping memo. The route 503 changes with movement of the terminal 4. The display device 44 displays the current location 504 based on current location information. The current location 504 is depicted as being the area of vegetables. The display position of the current location 504 indicator on the map 502 is changed with the movement of the terminal 4.

The display device 44 displays a total field 505. The total field 505 indicates a running total for the number of already registered commodities and a total amount of money due for the registered commodities. The total items (number of registered commodities) and the total amount of money are changed based on commodity registrations.

The display device 44 displays a captured image 506 captured by the capturing device 45, for example. The captured image 506 is an image of the area of vegetables. The captured image 506 is changed with the movement of the terminal 4. The display device 44 displays the character 507 so that the character 507 overlaps on the captured image

506. The character 507 is a character based on the character information in accordance with a store area. The display device 44 displays a guide message 508 based on guide message information so that the guide message 508 overlaps the captured image 506. The guide message 508 is a message indicating that the user has arrived in or is in the area of vegetables. The display device 44 may display the guide message 508 immediately after the character 507 is displayed, for example.

Figure 7:
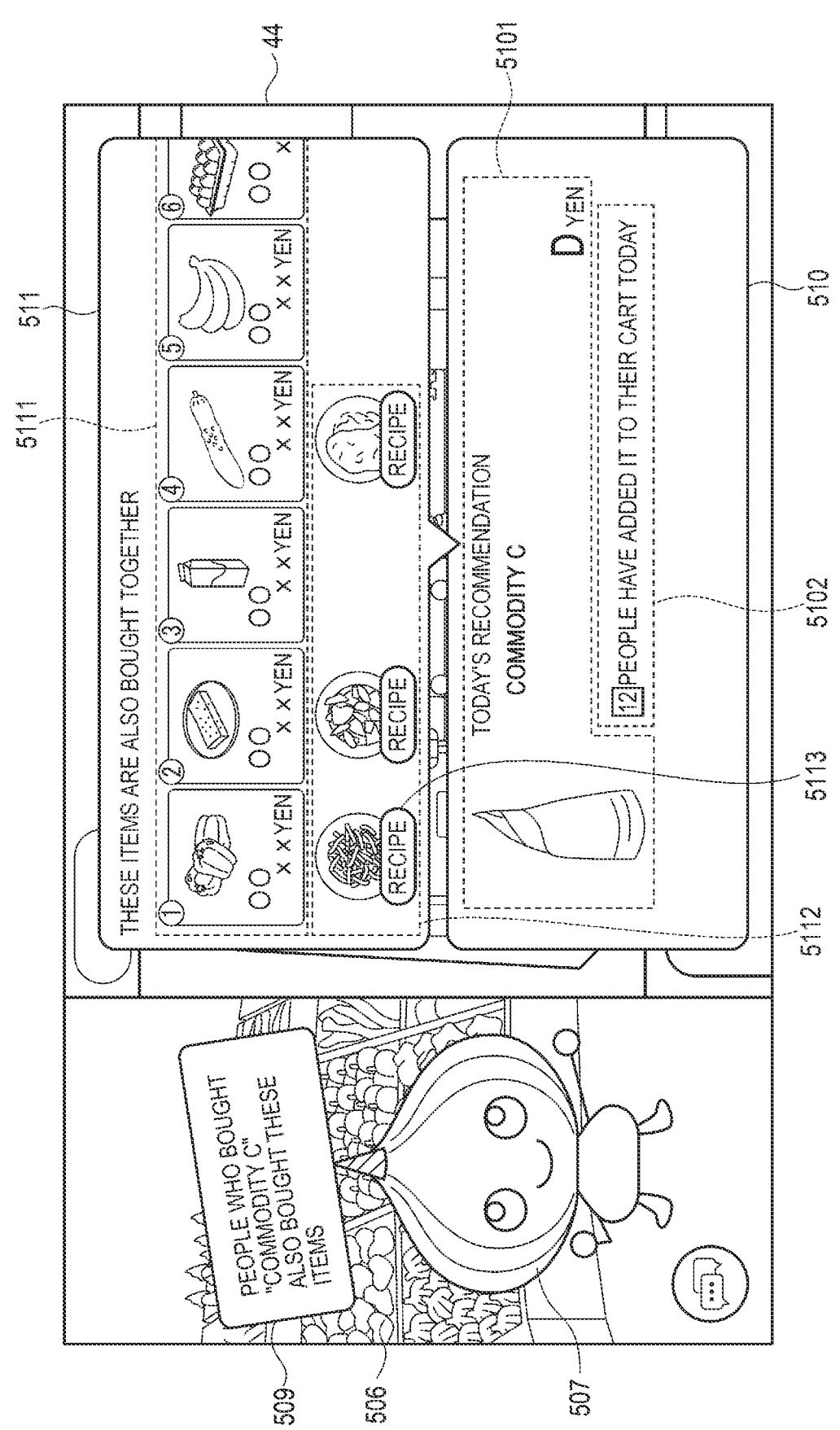
FIG. 7 is a diagram illustrating a display example of a registration result on a terminal.

FIG. 7 is a diagram illustrating a display example of a registration result on the terminal 4.

The area indicated by the positional information of the terminal 4 is assumed to be the area of vegetables in this example.

The display device 44 displays a guide message 509 based on guide message information so that the guide message 509 overlaps the captured image 506. The guide message 509 is a message indicating a recommended commodity and a related commodity.

The display device 44 displays a recommended commodity field 510. The recommended commodity field 510 includes a recommended commodity display area 5101. The display device 44 displays the name, the price, and the image of the recommended commodity in the recommended commodity display area 5101. The recommended commodity field 510 includes a registration result display area 5102. The display device 44 displays registration results of the other users in the registration result display area 5102.

The display device 44 displays a related commodity field 511. The related commodity field 511 includes a related commodity display area 5111. The display device 44 displays the name, the price, and the image of any related commodities in the related commodity display area 5111. The related commodity field 511 includes a recommended menu display area 5112. The display device 44 displays an image of any recommended menu (dish) in the recommended menu display area 5112. The display device 44 displays a button 5113 by which an instruction to display a recommended recipe can be input. A button 5113 may be displayed for each recommended menu in the recommended menu display area 5112.

Figure 8:
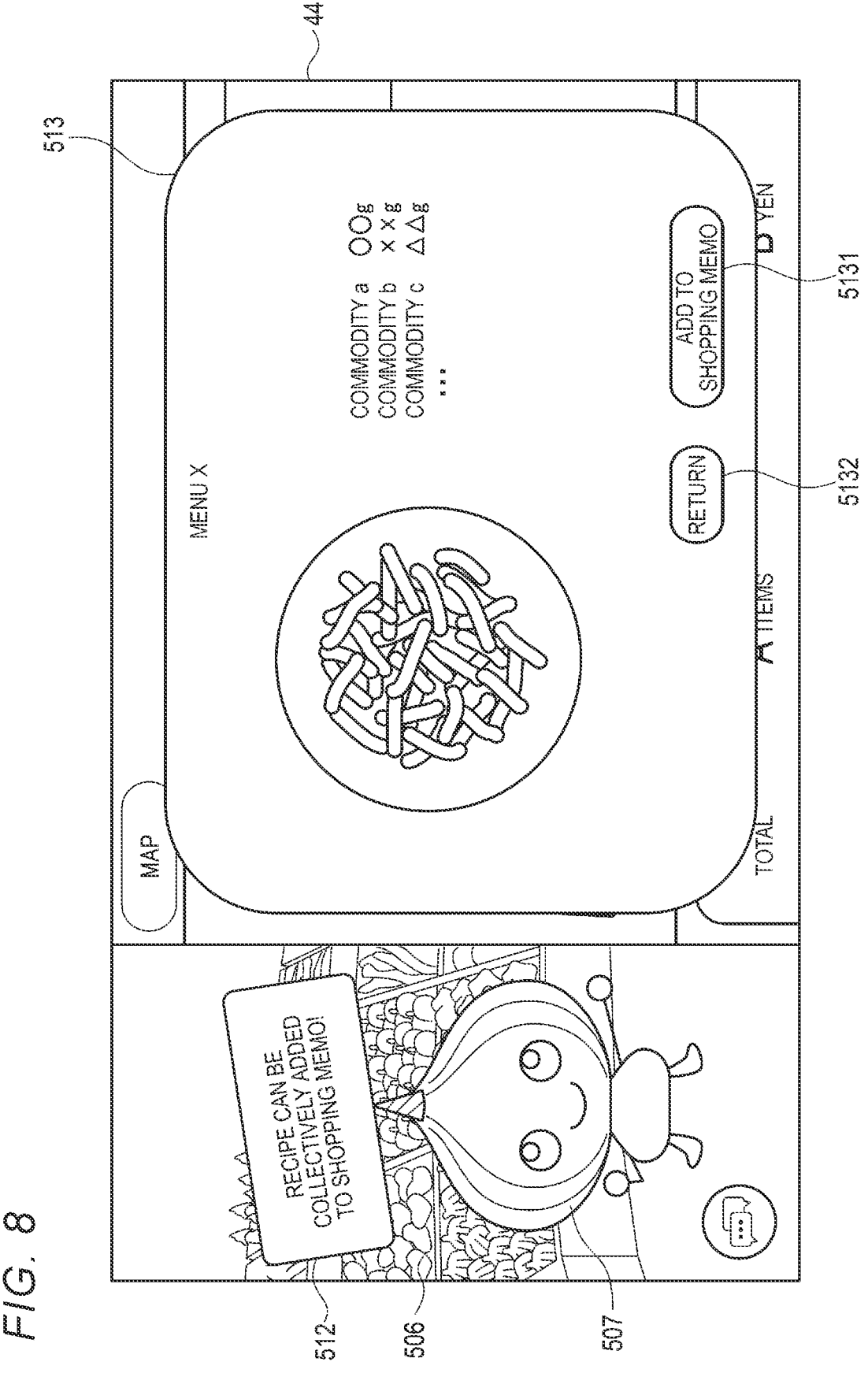
FIG. 8 is a diagram illustrating a display example of a recommended recipe on a terminal.

FIG. 8 is a diagram illustrating a display example of a recommended recipe in the terminal 4.

An area indicated by the positional information of the terminal 4 is again assumed to be the area of vegetables in this example. It is also assumed that the user has selected a button 5113 for one of the recommended menu options using the input device 43.

The display device 44 displays a guide message 512 based on guide message information so that the guide message 512 overlaps the captured image 506. The guide message 512 is a message indicating that the commodities corresponding to the plurality of ingredients included in the displayed recommended recipe can be added to the shopping memo.

The display device 44 displays a recommended recipe field 513. The display device 44 displays the recommended recipe in the recommended recipe field 513. The display device 44 displays a button 5131 in the recommended recipe field 513 by which an instruction to update the shopping memo can be input. The display device 44 displays a button 5132 in the recommended recipe field 513 by which an instruction to delete (clear) the recommended recipe field 513 can be input.

Advantages

According to an embodiment, the information processing apparatus can output information regarding registration results of other users related to a recommended commodity to a user terminal. The user terminal can display the registration results of the other users on a display unit.

Accordingly, it is possible to motivate a user to purchase a recommended commodity by providing the registration results of the other users. Therefore, it is possible to improve convenience of shopping in the store.

The embodiment may be configured as follows:

(1) An information processing apparatus including:
a position processing unit configured to acquire positional information of a terminal of a user; and
a communication processing unit configured to output information regarding a registration result of other users different from the user with regard to a recommended commodity in an area of a position indicated by the positional information among a plurality of areas of a store, to the terminal.

(2) The apparatus according to (1), in which the communication processing unit is configured to output information regarding other commodities different from the recommended commodity that has the registration result of the other users to the terminal.

(3) The apparatus according to (2), in which the communication processing unit is configured to output information regarding a purchase purpose ("reason to buy") of the recommended commodity based on the recommended commodity and the other commodity to the terminal.

(4) The apparatus according to (3), in which the communication processing unit is configured to output information regarding a plurality of commodities including the recommended commodity and the other commodity with regard to the purchase purpose to the terminal.

(5) A terminal including:
a position processing unit configured to acquire positional information of a terminal of a user; and
a display processing unit configured to display a registration result of other users different from the user with regard to a recommended commodity in an area of a position indicated by the positional information among a plurality of areas of a store on a display unit.

(6) The terminal according to (5), in which the display processing unit is configured to display other commodities different from the recommended commodity that has the registration result of the other users on the display unit.

(7) The terminal according to (6), in which the display processing unit is configured to display a purchase purpose of the recommended commodity based on the recommended commodity and the other commodities on the display unit.

(8) The terminal according to (7), in which the display processing unit is configured to display a plurality of commodities including the recommended commodity and the other commodity with regard to the purchase purpose on the display unit.

(9) An information processing method comprising:
acquiring positional information of a terminal of a user; and
outputting information regarding a registration result of other users different from the user with regard to a recommended commodity in an area of a position indicated by the positional information among a plurality of areas of a store to the terminal.

(10) An information processing method comprising:
a function of acquiring positional information of a terminal of a user; and
a function of displaying a registration result of other users different from the user with regard to a recommended commodity in an area of a position indicated by the positional information among a plurality of areas of a store on a display unit.

Other Embodiments

The above-described embodiments can also be applied to a method performed by an apparatus or a terminal. For example, an above-described embodiment may be implemented as a software program capable of causing a computer or a terminal device to perform each described function. The such a program may be stored in a non-transitory, computer-readable recording medium.

Such a program may be stored in an apparatus according to an embodiment or transferred separately from an apparatus. In the latter case, the program may be transferred via a network or on a non-transitory computer-readable recording medium such as a CD-ROM or a memory card.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A store system apparatus, comprising:
a communication interface connectable to a terminal of a customer of a store;
a storage unit storing registration results of a plurality of customers; and
a processor configured to:
acquire position information of the terminal of the customer via the communication interface;
cause a first character to be displayed on the terminal along with a store map of the store, the first character being selected from a plurality of characters according to an area of the store corresponding to the acquired position information;
output recommended commodity information via the communication interface to the terminal according to the area of the store corresponding to the acquired position information, the recommended commodity information indicating a recommended commodity that is in the area of the store; and
output registration summary information based on the stored registration results of the plurality of customers via the communication interface to the terminal.

2. The store system apparatus according to claim 1, wherein the registration summary information includes a total number of the recommended commodity registered by the plurality of customers.

3. The store system apparatus according to claim 1, wherein the registration summary information includes a total number of other customers who have registered the recommended commodity.

4. The store system apparatus according to claim 1, wherein the processor is further configured to output related commodity information via the communication interface to the terminal according to the recommended commodity, the related commodity information indicating one or more commodity other than the recommended commodity.

5. The store system apparatus according to claim 4, wherein the related commodity information is determined based on stored registration results of the plurality of customers.

6. The store system apparatus according to claim 4, wherein the processor is further configured to output a recommended recipe via the communication interface to the terminal, the recommended recipe using the recommended commodity and the one or more commodity other than the recommended commodity.

7. The store system apparatus according to claim 6, wherein the processor is further configured to output an ingredient list for the recommended recipe via the communication interface to the terminal, the ingredient list including commodity codes of each ingredient in the recommended recipe not already registered for purchase with the terminal.

8. The store system apparatus according to claim 1, wherein the processor is further configured to cause a second character to be displayed along with the store map of the store when the acquired position information indicates the terminal has moved to another area of the store.

9. A method for a store system apparatus, the method comprising:
acquiring position information of a terminal of a customer via a communication interface;
causing a character to be displayed on the terminal along with a store map of store, the character being selected from a plurality of characters according to an area of the store corresponding the acquired position information;
outputting recommended commodity information via the communication interface to the terminal according to the area of the store corresponding to the acquired position information, the recommended commodity information indicating a recommended commodity that is in the area of the store; and
outputting registration summary information based on stored registration results of a plurality of customers via the communication interface to the terminal.

10. The method according to claim 9, wherein the registration summary information includes a total number of the recommended commodity registered by the plurality of customers.

11. The method according to claim 9, wherein the registration summary information includes a total number of other customers who have registered the recommended commodity.

12. The method according to claim 9, further comprising:
outputting related commodity information via the communication interface to the terminal according to the recommended commodity, the related commodity information indicating one or more commodity other than the recommended commodity.

13. The method according to claim 12, wherein the related commodity information is determined based on stored registration results of the plurality of customers.

14. The method according to claim 12, further comprising:
outputting a recommended recipe via the communication interface to the terminal, the recommended recipe using the recommended commodity and the one or more commodity other than the recommended commodity.

15. The method according to claim 14, further comprising:
upon request from the terminal, outputting an ingredient list for the recommended recipe via the communication interface to the terminal, the ingredient list including commodity codes of each ingredient in the recommended recipe not already registered for purchase with the terminal.

16. A store system apparatus, comprising:

a communication interface connectable to a terminal of a customer of a store;

a storage unit storing registration results of a plurality of customers; and a processor configured to:

acquire position information of the terminal of the customer via the communication interface;

cause a character to be displayed along with a store map of the store, the character being selected from a plurality of characters according to an area of the store corresponding to the acquired position information;

output recommended commodity information via the communication interface to the terminal according to the area of the store corresponding to the acquired position information, the recommended commodity information indicating a recommended commodity that is in the area of the store; and output registration summary information based on the stored registration results of the plurality of customers via the communication interface to the terminal.

17. The store system apparatus according to claim 16, wherein the processor is further configured to output related commodity information via the communication interface to the terminal according to the recommended commodity, the related commodity information indicating one or more commodity other than the recommended commodity.

18. The store system apparatus according to claim 17, wherein the related commodity information is determined based on stored registration results of the plurality of customers.

19. The store system apparatus according to claim 17, wherein the processor is further configured to output a recommended recipe via the communication interface to the terminal, the recommended recipe using the recommended commodity and the one or more commodity other than the recommended commodity.

20. The store system apparatus according to claim 16, wherein the character to be displayed changes when the area of the store corresponding to the acquired position information changes.

* * * * *